(12) United States Patent
Okuzawa et al.

(10) Patent No.: US 9,001,496 B2
(45) Date of Patent: Apr. 7, 2015

(54) ELECTRIC DOUBLE-LAYER CAPACITOR AND ELECTRODE THEREFOR

(71) Applicant: Panasonic Corporation, Osaka (JP)

(72) Inventors: Tomohiro Okuzawa, Osaka (JP); Motonori Morikazu, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 168 days.

(21) Appl. No.: 13/911,097

(22) Filed: Jun. 6, 2013

(65) Prior Publication Data
US 2013/0329340 A1 Dec. 12, 2013

(30) Foreign Application Priority Data

Jun. 11, 2012 (JP) .................................. 2012-131612

(51) Int. Cl.
H01G 9/00 (2006.01)
H01G 11/28 (2013.01)
H01G 11/68 (2013.01)

(52) U.S. Cl.
CPC ................. *H01G 11/28* (2013.01); *Y02E 60/13* (2013.01); *H01G 11/68* (2013.01)

(58) Field of Classification Search
USPC ................. 361/502, 503–504, 508, 509, 512, 361/516–519, 525–529
See application file for complete search history.

(56) References Cited

U.S. PATENT DOCUMENTS

| 6,134,760 | A | 10/2000 | Mushiake et al. | |
| 6,379,402 | B1 * | 4/2002 | Suhara et al. | 29/25.03 |
| 6,426,862 | B1 * | 7/2002 | Vasechkin et al. | 361/502 |
| 6,466,429 | B1 * | 10/2002 | Volfkovich et al. | 361/502 |
| 6,631,074 | B2 * | 10/2003 | Bendale et al. | 361/509 |
| 7,446,998 | B2 * | 11/2008 | Kazaryan et al. | 361/502 |
| 7,924,548 | B2 | 4/2011 | Yamada et al. | |
| 8,755,169 | B2 * | 6/2014 | Kuriki et al. | 361/502 |

FOREIGN PATENT DOCUMENTS

JP 11-154630 6/1999

* cited by examiner

*Primary Examiner* — Nguyen T Ha
(74) *Attorney, Agent, or Firm* — Panasonic Patent Center

(57) ABSTRACT

An electrode for electric double-layer capacitor includes a collector with a protective layer containing phosphorous on its surface, and a polarizable electrode layer that is formed on this collector and can adsorb and desorb ions. An amount of a phosphorous compound per unit surface area of the collector, eluted when the collector is immersed into water, is not greater than 1.35 mg/m$^2$ in terms of phosphorous equivalent. An electric double-layer capacitor employs this electrode for at least one of a positive electrode and a negative electrode.

6 Claims, 3 Drawing Sheets

ELECTRIC DOUBLE-LAYER CAPACITOR AND ELECTRODE THEREFOR

BACKGROUND

1. Technical Field

The technical field relates to electric double-layer capacitors typically employed in a range of electronic devices, electric appliances, industrial equipment, and vehicles; and their electrodes.

2. Background Art

An electric double-layer capacitor is developed as an energy storage device, typically for the purpose of power assist or backup of electronic devices. For this purpose, it is necessary to decrease internal resistance of the electric double-layer capacitor to increase its power density. It is also necessary to reduce interface resistance at the contact portion of a polarizable electrode layer and a collector in a pair of positive and negative electrodes configuring the electric double-layer capacitor. To reduce this interface resistance, one proposed idea is to form a conductive layer with good conductivity and adhesivity between the collector and the polarizable electrode layer. This conductive layer is formed of carbon black with good conductivity, and a binder with good adhesivity, to increase the adhesion strength between the polarizable electrode layer and the collector while reducing interface resistance.

SUMMARY

An electrode for electric double-layer capacitor and an electric double-layer capacitor have a good high-temperature characteristic. The electrode for electric double-layer capacitor includes a collector with a protective layer containing phosphorous on its surface, and a polarizable electrode layer that is formed above this collector and can reversibly adsorb and desorb ions. An amount of a phosphorous compound per unit surface area of the collector, eluted when the collector is immersed into water, is not greater than 1.35 mg/m$^2$ in terms of phosphorous equivalent.

The electric double-layer capacitor employing the electrode with this construction for at least one of the positive and negative electrodes can suppress degradation at high temperatures.

DETAILED DESCRIPTION OF PREFERRED EMBODIMENTS

A disadvantage of a conventional electric double-layer capacitor is briefly described before describing an embodiment. The characteristic of a conventional electric double-layer capacitor degrades over time if used at high temperatures for long periods: the surface of collector configuring the electrode corrodes, causing the resistance of the contact interface between a polarizable electrode layer and a collector to increase.

Figure 1:
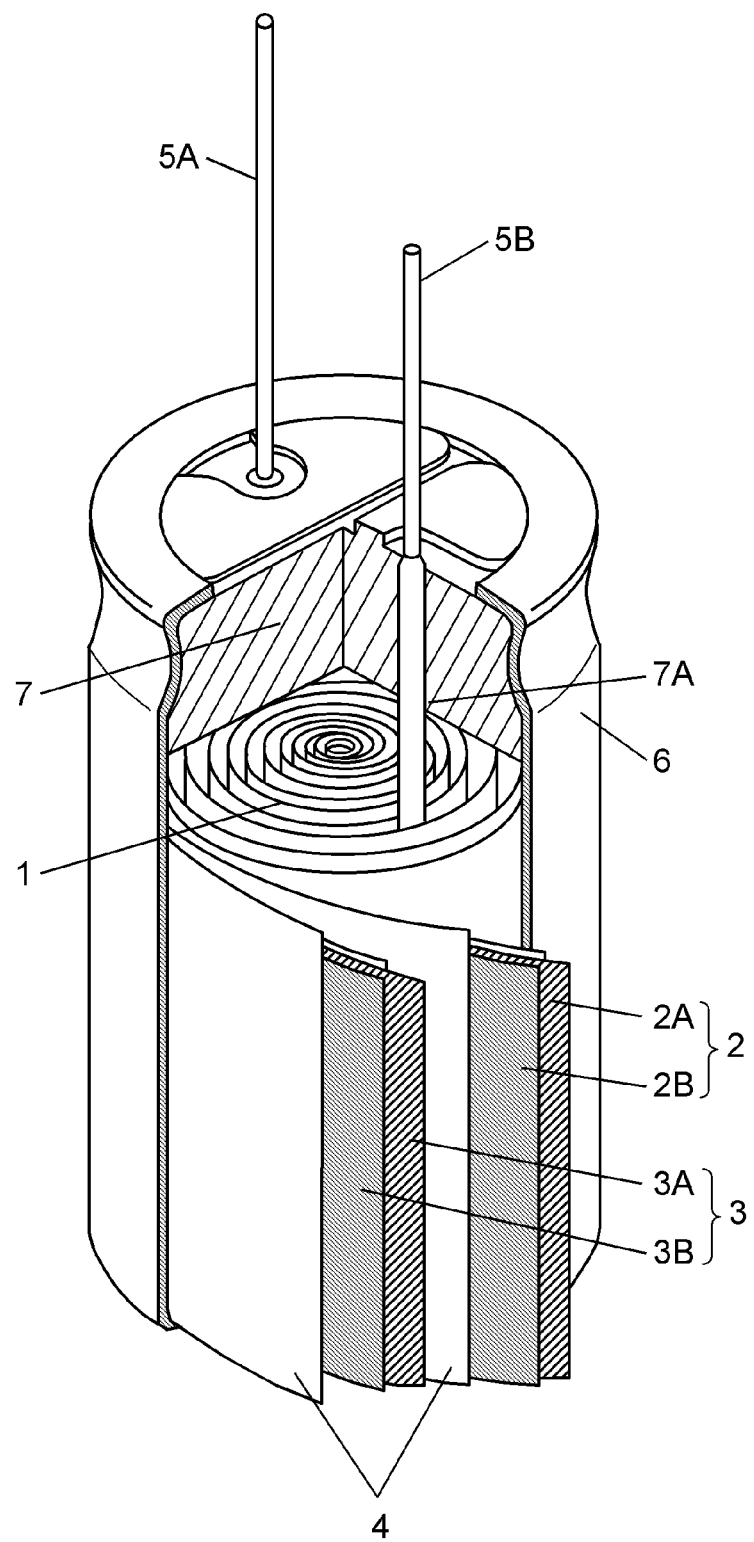
FIG. 1 is a partly cutaway perspective view of an electric double-layer capacitor in accordance with an embodiment.

The embodiment is described hereinafter with reference to drawings. FIG. 1 is a partly cutaway perspective view illustrating the construction of an electric double-layer capacitor in the embodiment. This electric double-layer capacitor includes capacitor element 1, electrolytic solution (not illustrated) with which capacitor element 1 is impregnated, and outer housing 10 accommodating capacitor element 1 and the electrolytic solution.

Capacitor element 1 includes positive electrode 2, negative electrode 3 facing positive electrode 2, and separator 4 disposed between positive electrode 2 and negative electrode 3. Positive electrode 2, negative electrode 3, and separator 4 are rolled (wound) with each other. Other than this construction, these components may be laminated to configure capacitor element 1. Positive electrode 2 includes collector 2A and polarizable electrode layer (hereafter referred to as "electrode layer") 2B that is formed above collector 2A and can reversibly adsorb and desorb ions. In the same way, negative electrode 3 includes collector 3A and polarizable electrode layer (hereafter referred to as "electrode layer") 3B that is formed above collector 3A and can reversibly adsorb and desorb ions. Positive electrode 2 and negative electrode 3 are connected to lead wires 5A and 5B that are leading members, respectively. Capacitor element 1 and electrolytic solution are housed in cylindrical bottomed case 6. An open end of case 6 is sealed with sealing member 7 such that lead wires 5A and 5B protrude from sealing member 7. Case 6 and sealing member 7 configure outer housing 10.

Figure 2:
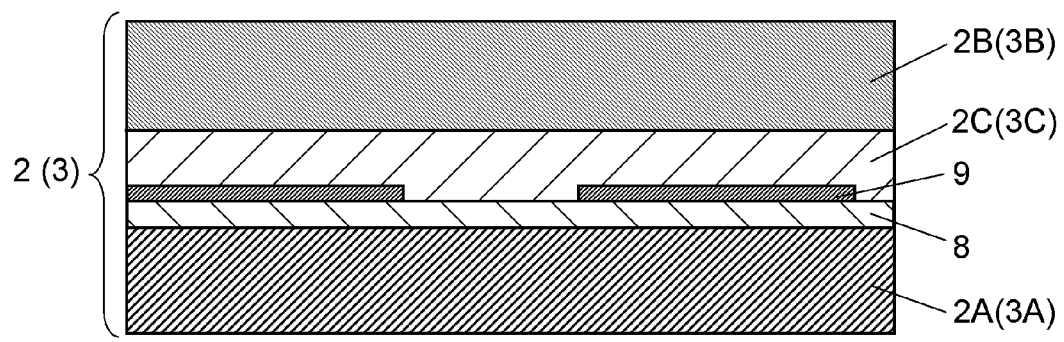
FIG. 2 is a schematic sectional view illustrating a construction of an electrode employed in the electric double-layer capacitor in FIG. 1.

FIG. 2 is a schematic sectional view illustrating the construction of positive electrode 2 and negative electrode 3. Positive electrode 2 includes sheet-like collector 2A formed of conductive material, such as metal, conductive layer 2C formed on the surface of collector 2A, and electrode layer 2B formed on conductive layer 2C. Protective layer 8 containing phosphorous and non-fixing phosphorous compound 9 existing around protective layer 8 are formed on the surface of collector 2A facing conductive layer 2C. In the same way, negative electrode 3 includes sheet-like collector 3A formed of conductive material, such as metal, conductive layer 3C formed on the surface of collector 3A, and electrode layer 3B formed on conductive layer 3C. Protective layer 8 containing phosphorous and non-fixing phosphorous compound 9 existing around protective layer 8 are formed on the surface of collector 3A facing conductive layer 3C. Since positive electrode 2 and negative electrode 3 are formed similarly, positive electrode is representatively described below.

Collector 2A is, for example, formed of about 15-μm thick aluminum plain foil with high purity (containing 99% or more Al). Other than this, collector 2A may be formed of an etched aluminum foil, a metal foil with plasma treatment in the atmosphere or other diversifying gas atmospheres, such as inactive gas, and the like. A material configuring collector 2A is not limited to aluminum. Any of copper, nickel, iron, stainless steel, and platinum is applicable.

Conductive layer 2C includes conductive material and binder (both not illustrated) to increase conductivity between collector 2A and electrode layer 2B. Conductive layer 2C is provided between collector 2A and electrode layer 2B, so as to function also as adhesive to attach collector 2A and electrode layer 2B together.

As the conductive material, carbon black, such as acetylene black, may be used. To make conductive layer 2C thin, the average particle size (diameter) of carbon black is on the nanometer-order of preferably around 10 nm to 300 nm. As a binder, water-soluble resin, such as cellulose, is preferably used. These conductive material and binder are mixed at the weight ratio of, for example, 4:1 to form conductive layer 2C. More specifically, this mixture is mixed with solvent to prepare a coating dispersion liquid. This coating dispersion liquid is applied to collector 2A, and then the solvent is removed to form conductive layer 2C. As the solvent, water may be used.

To form protective layer 8 containing phosphorous for protecting collector 2A, a phosphorous compound is added to the above coating dispersion liquid as a source of phosphorous. For example, the phosphorous compound is added by 0.2 wt % with respect to the weight of the above coating dispersion liquid. The phosphorous compound is, for example, ammonium dihydrogen phosphate. The purity of ammonium dihydrogen phosphate is preferably not less than 98%. Still more, the pH level of ammonium dihydrogen phosphate is preferably not less than 3.8, but further preferably not greater than 4.4. The pH level in the above description is measured when dissolving 50 g of ammonium dihydrogen phosphate in 1-liter water at 20° C.

The phosphorous compound for forming protective layer 8 is not limited to ammonium dihydrogen phosphate. Other than this, phosphate such as sodium dihydrogen phosphate, disodium hydrogen phosphate, and potassium dihydrogen phosphate; pyrophosphate such as sodium pyrophosphate; polyphosphate; metaphosphate such as sodium hexametaphosphate; and phosphite may be used.

The coating dispersion liquid containing phosphorous compound, as described above, is used as an anchor liquid containing solvent such as water, and applied to collector 2A in a thickness of typically between 0.2 μm and 1.2 μm. Then, collector 2A is dried in the atmosphere at 100° C. to remove the solvent.

Then, electrode layer 2B is formed on dried conductive layer 2C. Electrode layer 2B typically contains activated carbon, binder, and conductive auxiliary agent (none of them illustrated).

For example, phenolic resin activated carbon with average particle size (diameter) of 5 μm is used as the activated carbon. Other than this, carbon materials made from coconut shell, wood powder, paper, petroleum coke, petroleum pitch, and the like may be used. As long as activated carbon is porous for adsorbing and desorbing ions on its surface, its material is not particularly limited. As the binder, a solution, for example, of sodium salt of carboxyl methyl cellulose (CMC) is used. As a conductive auxiliary agent, for example, acethylene black is used. Activated carbon, binder, and conductive auxiliary agent are mixed in the weight ratio of 10:2:1 in this sequence. This mixture is kneaded by a kneader to adjust to a predetermined viscosity to prepare paste.

This paste is applied to the both faces of collector 2A where conductive layer 2C is formed on its surfaces, and dried in the atmosphere at 100° C. In this way, electrode layers 2B with thickness of 40 μm are formed on the each face. Then, a laminated body of collector 2A, conductive layers 2C, and electrode layers 2B is slit in a predetermined width.

As shown in FIG. 1, conductive layer 2C and electrode layer 2B formed on both faces of collector 2A are partly removed to connect lead wire 5A to an exposed part of collector 2A, typically by caulking. FIG. 2 only shows one face of collector 2A.

Positive electrode 2 and negative electrode 3 as manufactured above are disposed facing each other, and separator 4 is disposed between positive electrode 2 and negative electrode 3. They are rolled to complete capacitor element 1. As separator 4, cellulose paper or PTFE with thickness of about 35 μm and density of 0.45 g/cm$^3$ may be used.

As the solute of electrolytic solution, ethyl-dimethyl imidazolium tetrafluoroborate (EDMI$^+$BF$_4^-$) may be used. As anion of the solute, those containing fluorine atom is preferable in a view point of withstand voltage characteristic. In particular, BF$_4^-$ or PF$_6^-$ is preferable. As the solvent, an organic solvent is used. For example, propylene carbonate (PC) can be used. The concentration of solute is 0.5 to 2.0 mol/l. Other than this, the solute may be quaternary ammonium salt or imidazolium salt. As long as a compound does not likely cause chemical reaction, such as decomposition, in a predetermined voltage range, the solute is not limited to specific compounds. The organic solvent may be γ-butyrolactone, γ-caprolactone, or γ-valerolactone without being limited to PC. Other than lactones, carbonates such as ethylene carbonate, and sulfolanes are also applicable.

Case 6 is configured with metal, such as aluminum, copper, and nickel, in a view point of radiation performance. However, material is not limited as long as it has low risk of reacting with the electrolytic solution. Other than a cylindrical bottomed shape, case 6 may have prismatic body.

Sealing member 7 is, for example, formed of butyl rubber. However, as long as it is formed of rubber material with elasticity, its material is not limited. Through holes 7A are provided in sealing member 7. Lead wires 5A and 5B protruding from capacitor element 1 are inserted into through holes 7A. In this state, sealing member 7 is disposed on the opening of case 6. Then, the outer periphery of the opening of case 6 where sealing member is disposed 7 is bent to the inward side of case 6. Then, the open end of case 6 is curled. By these procedures, sealing member 7 is fixed by pressure-bonding. The opening of case 6 is thus sealed.

Depending on the shape of capacitor element 1, a laminate pack may be used as outer housing 10, instead of case 6 and sealing member 7.

As shown in FIG. 2, positive electrode 2 and negative electrode 3 have protective layers 8 containing phosphorous on their surfaces. In other words, collectors 2A and 3A have protective layers 8 containing phosphorous on their surfaces. They have a characteristic that an amount of phosphorous compound per unit area of collectors 2A and 3A eluted when collectors 2A and 3A are immersed in water is 1.35 mg/m$^2$ or less in terms of phosphorous equivalent.

Protection layer 8 can suppress corrosion of collectors 2A and 3A by protecting collectors 2A and 3A from chemical reaction with electrolytic solution. Protective layer 8 is considered to be generated by reaction of metal forming collectors 2A and 3A and phosphorous compound, such as ammonium dihydrogen phosphate, contained in conductive layers 2C and 3C. In other words, protective layer 8 is considered as a compound of metal forming collectors 2A and 3A and phosphorous. As shown in FIG. 2, a compound of metal forming collectors 2A and 3A and phosphorous is formed on the surfaces of collectors 2A and 3A as protective layers 8. This construction enables the electric double-layer capacitor of this embodiment to have good high-temperature characteristic and long life.

Positive electrode 2 and negative electrode 3 may contain non-fixing phosphorous compound 9 that exists liberated from collectors 2A and 3A without reacting with collectors 2A and 3A, separated from protective layer 8. Non-fixing phosphorous compound 9 is a residue that remains unreacted portion of the phosphorous compound added to the coating dispersion liquid for forming conductive layers 2C and 3C. If a large amount of non-fixing phosphorous compound 9 that does not contribute to the formation of protective layer 8 remains in capacitor element 1, non-fixing phosphorous compound 9 may react with electrolytic solution in capacitor element 1 as charging and discharging are repeated. In this case, a cycle characteristic degrades. Therefore, thermal resistance of the electric double-layer capacitor can be further improved by controlling the amount of non-fixing phosphorous compound 9 in capacitor element 1.

In the embodiment, the following method is used for identifying the amount of non-fixing phosphorous compound 9. Specifically, collectors 2A and 3A on which protective layers 8 are formed are immersed in purified water (at normal temperature). Then, an eluted amount of phosphorous compound from collectors 2A and 3A to water is analyzed, and the amount of non-fixing phosphorous compound 9 is estimated from the eluted amount. In the embodiment, the amount of phosphorous compound is defined by an amount per unit area ($mg/m^2$) of collectors 2A and 3A. For example, ion chromatography may be used to quantitatively analyze the phosphorous compound eluted in the purified water. As areas of collectors 2A and 3A, areas where conductive layers 2C and 3C and electrode layers 2B and 3B are applied in collectors 2A and 3A are used. To estimate the amount of phosphorous compound which is non-fixing phosphorous compound 9, using collectors 2A and 3A to which conductive layers 2C and 3C and electrode layers 2B and 3B are already applied, collectors 2A and 3A are immersed in the purified water after removing electrode layers 2B and 3B and conductive layers 2C and 3C from collectors 2A and 3A, and then the eluted amount is analyzed.

If protective layer 8 is formed by adding the phosphorous compound to the coating dispersion liquid for forming conductive layers 2C and 3C as described above, the amount of phosphorous compound forming protective layer 8 is not less than 20 $mg/m^2$ and not greater than 100 $mg/m^2$ per unit area of collectors 2A and 3A. More typically, not less than 65 $mg/m^2$ and not greater than 100 $mg/m^2$. An amount of phosphorous compound configuring protective layer 8 is identified in the following way. First, after dissolving non-fixing phosphorous compound 9 in purified water, collectors 2A and 3A are immersed in an acid solution. An amount of phosphorous compound dissolved in this acid solution is quantitatively analyzed using ion chromatography. An amount of phosphorous compound configuring protective layer 8 can be identified based on this value.

In FIG. 2, protective layer 8 and non-fixing phosphorous compound 9 are illustrated as layers. However, they are not limited to layers. Still more, protective layer 8 does not need to cover entire area where electrode layers 2B and 3B are provided on collectors 2A and 3A. In the embodiment, the phosphorous compound is added to conductive layers 2C and 3C in order to form protective layer 8. However, this is not the only method. The phosphorous compound may be provided on the surfaces of collectors 2A and 3A in advance to form protective layers 8 after being housed in case 6 as capacitor element 1. Or, protective layers 8 may be formed on the surfaces of collectors 2A and 3A before forming conductive layers 2C and 3C on collectors 2A and 3A.

Figure 3:
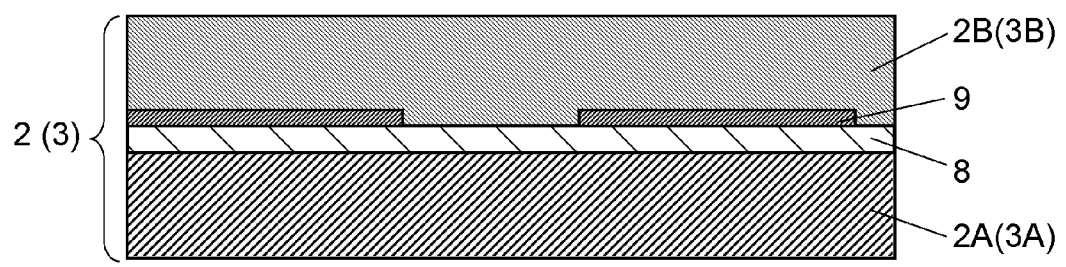
FIG. 3 is a schematic sectional view illustrating another construction of the electrode employed in the electric double-layer capacitor shown in FIG. 1.

Next, a construction different from positive electrode 2 and negative electrode 3 in FIG. 2 is described with reference to FIG. 3. FIG. 3 is a schematic sectional view illustrating another construction of positive electrode 2 and negative electrode 3 employed in the electric double-layer capacitor in the embodiment.

In the construction shown in FIG. 3, conductive layers 2C and 3C are removed from the construction in the first embodiment. In other words, electrode layers 2B and 3B are formed on collectors 2A and 3A, respectively, such that they are in contact with collectors 2A and 3A. To form protective layer 8 on the surfaces of collectors 2A and 3A, the phosphorous compound such as ammonium dihydrogen phosphate is added to electrode layers 2B and 3B. An added amount is, for example, 0.1 wt %. Also in this construction that electrode layers 2B and 3B are in direct contact with collectors 2A and 3A, protective layer 8 containing phosphorous can be formed on the surfaces of collectors 2A and 3A by adding the phosphorous compound to electrode layers 2B and 3B. In addition, thermal resistance of electric double-layer capacitor can be improved by setting the eluted amount of phosphorous compound per unit surface area of collectors 2A and 3A to not greater than 1.35 $mg/m^2$ in terms of phosphorous equivalent on immersing collectors 2A and 3A in water. A range of preferable amount of phosphorous compound contained in protective layer 8 is also same as that described previously.

Other than adding the phosphorous compound to electrode layers 2B and 3B, the phosphorous compound may be provided on the surfaces of collectors 2A and 3A in advance to form protective layers 8 after being housed in case 6 as capacitor element 1. Or, protective layers 8 may be formed on the surfaces of collectors 2A and 3A before forming electrode layers 2B and 3B on collectors 2A and 3A.

Hereinafter, the electric double-layer capacitor shown in FIG. 1 is manufactured employing positive electrode 2 and negative electrode 3 with construction shown in FIG. 2. Evaluation results of its performance are described.

Samples A to J of the electric double-layer capacitor are prepared as described below. First, a high-purity aluminum plain foils (containing 99% or more Al) with thickness of about 15 μm are prepared as base material of collectors 2A and 3A in positive electrode 2 and negative electrode 3. Then, the coating dispersion liquid is applied to this base material in a thickness of 1.2 μm. This coating dispersion liquid is prepared by dispersing acetylene black with average particle size of 60 nm and also dissolving ammonium dihydrogen phosphate in a water solution of CMC. The weight ratio of acetylene black and solid contents of CMC is 4:1. The amount of ammonium dihydrogen phosphate is 90 $mg/m^2$ per unit area of collectors 2A and 3A. Then, to remove water, which is solvent, the coated base material is dried in the atmosphere at 100° C. In this way, conductive layers 2C and 3C are formed.

Next, the paste with aforementioned composition is applied to conductive layers 2C and 3C, and dried to form electrode layers 2B and 3B. In this way, a laminated body of the plain foil, conductive layer 2C, and electrode layer 2B; and a laminated body of the plain foil, conductive layer 3C, and electrode layer 3B are prepared. The paste contains 10 parts by weight of phenol resin activated carbon with average particle size of 5 μm, 2 parts by weight of CMC, and 1 part by weight of acetylene black. Then, these laminated bodies are cut into positive electrode 2 and negative electrode 3. In collectors 2A and 3A, areas where electrode layers 2B and 3B are applied are 2 cm×2 cm.

Separator 4 made of cellulose paper with thickness of about 35 μm and density of 0.45 $g/cm^3$ is disposed between positive electrode 2 and negative electrode 3 prepared as described above. Then, this is impregnated with the electrolytic solution prepared by dissolving $EDMI^+BF_4^-$ in PC at the concentration of 1.0 mol/l, and sealed with an aluminum laminate pack to prepare samples A to J of electric double-layer capacitor.

Samples A to J have different amount of elution of phosphorous compound from collectors 2A and 3A to water. If the aging conditions are the same, an amount of phosphorous compound fixed to collectors 2A and 3A as protective layers 8 becomes almost the same. Therefore, the added amount of phosphorous compound is changed among Samples A to J. In Sample A, the added amount of phosphorous compound per unit area of collectors 2A and 3A is 90.4 mg/m². In Samples B to J, the added amount of phosphorous compound is gradually increased in this sequence, as shown in Table 1. For aging, each electric double-layer capacitor is kept at 60° C. for 24 hours in the state 2.8-V voltage is applied. In Sample K prepared for comparison, ammonium dihydrogen phosphate is not added to the coating dispersion liquid.

Figure 4:
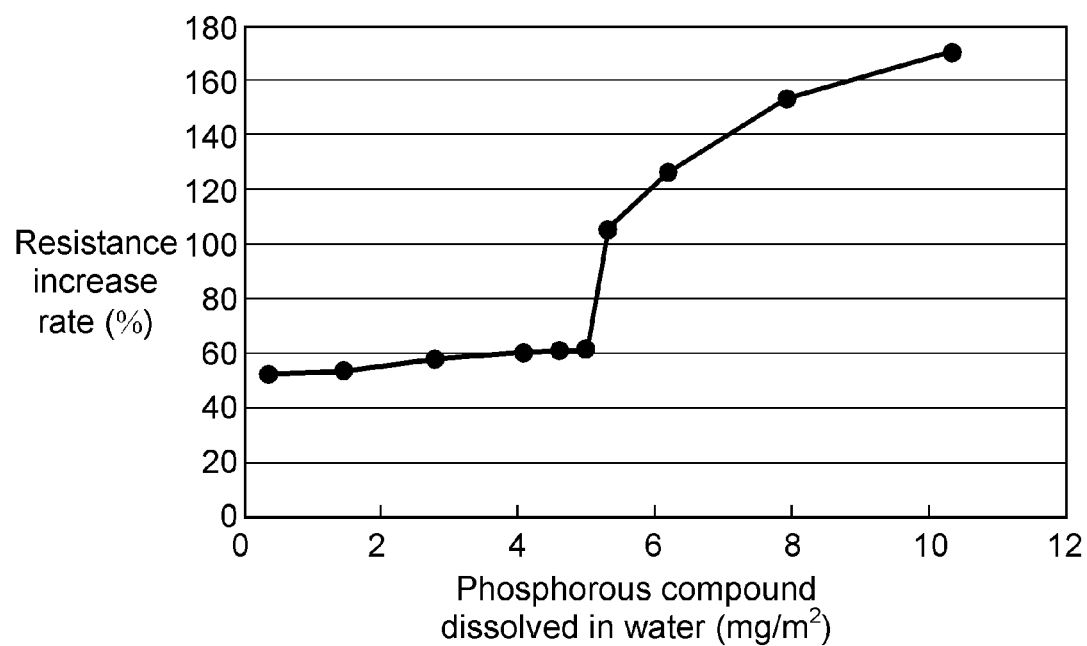
FIG. 4 is a chart illustrating the relationship between an amount of phosphorous compound eluted from a collector to water and an increase in resistance by charging and discharging for long periods in the electric double-layer capacitor in accordance with the embodiment.

A change rate of internal resistance in each sample after charging and discharging for 400 hours at constant current of 10 mA at 60° C. is calculated in these electric double-layer capacitor of Samples A to K. Charge cutoff voltage is 2.8V, and discharge cutoff voltage is 1.5V. Change rates of internal resistances in Samples A to J are compared by the ratio with respect to the change rate of Sample K. Each of the change rates is expressed in the ratio of a difference between resistance after long-hour charging and discharging and initial resistance with respect to the initial resistance of each sample. Table 1 and FIG. 4 show their results.

TABLE 1

| Sample | Added amount of phosphorous compound (mg/m²) | Amount of phosphorous compound eluted in water (mg/m²) | Resistance increase rate (%) |
| --- | --- | --- | --- |
| A | 90.4 | 0.4 | 51.9 |
| B | 91.5 | 1.5 | 53.2 |
| C | 92.8 | 2.8 | 57.4 |
| D | 94.1 | 4.1 | 59.7 |
| E | 94.6 | 4.6 | 60.6 |
| F | 95.0 | 5.0 | 61.2 |
| G | 95.3 | 5.3 | 105 |
| H | 96.2 | 6.2 | 125 |
| I | 97.9 | 7.9 | 153 |
| J | 100.3 | 10.3 | 170 |
| K | 0 | — | 100 |

As shown in Table 1 and FIG. 4, the change rate is below 100%, compared to Sample K, when dissolution of phosphorous compound is small after charging and discharging at high temperatures, and thus an increase in resistance is suppressed. However, when the dissolution exceeds a certain level, a degradation trend of characteristic of electric double-layer capacitor is drastically changed. It is apparent from Table 1 and FIG. 4 that this point of change in trend is when the amount of non-fixing phosphorous compound 9 dissolved in water, which remains around protective layer 8 without contributing to the formation of protective layer, reaches 5 mg/m². When converted to phosphorous equivalent, 5 mg/m² of ammonium dihydrogen phosphate, which is non-fixing phosphorous compound 9, is equivalent to 1.35 mg/m².

Accordingly, the high-temperature characteristic of electric double-layer capacitor can be improved by keeping an eluted amount of phosphorous compound to water from collectors 2A and 3A on which protective layers 8 are formed to not greater than 1.35 mg/m² in terms of phosphorous equivalent.

Less elution of phosphorous compound from collectors 2A and 3A to water is more preferable. Ideally, in other words, it is preferable that the phosphorous compound not contributing to the formation of protective layer 8 does not exist. Therefore, the lower limit of elution is 0 mg/m².

In this embodiment, the method of leading positive electrode 2 and negative electrode 3 outside outer housing 10 from capacitor element 1 is not limited to the use of lead wires 5A and 5B. Exposed portions where electrode layers 2B and 3B are not formed may be created on parts of collectors 2A and 3A, and multiple ends of these exposed portions may be electrically connected to leading members. One example of this construction is to expose one ends of collectors 2A and 3A from electrode layers 2B and 3B. Positive electrode 2 and negative electrode 3 are disposed facing each other with these exposed ends in opposite directions. These exposed ends protruding in opposite directions may be connected to conductive materials configuring terminals, respectively.

Still more, in the above description, the eluted amount of phosphorous compound on immersing collectors 2A and 3A in water is limited. However, this limit may be applied only to collector 2A of positive electrode 2 or collector 3 of negative electrode 3. Also in this case, the aforementioned effect can be achieved. Furthermore, this may be applied to a capacitor that adopts the combination of a negative electrode whose potential drops by adsorbing lithium ions and aforementioned positive electrode 2.

According to the electric double-layer capacitor employing the electrode in the embodiment, an increase in resistance can be suppressed when charging and discharging for long periods. Therefore, the use of this capacitor is promising in mobile devices that require severe charge and discharge conditions, power assist of heat source equipment, backup of large-capacity power supply, and the like.

What is claimed is:

1. An electrode for electric double-layer capacitor, comprising:
   a collector including a protective layer containing phosphorous on a surface thereof; and
   a polarizable electrode layer that is formed above the collector and capable of reversibly adsorbing and desorbing ions;
   wherein an amount of a phosphorous compound per unit surface area of the collector, eluted when the collector is immersed into water, is not greater than 1.35 mg/m² in terms of phosphorous equivalent.

2. The electrode for electric double-layer capacitor according to claim 1, further comprising a conductive layer in contact with the collector,
   wherein the polarizable electrode layer is in contact with the conductive layer.

3. The electrode for electric double-layer capacitor according to claim 1,
   wherein the polarizable electrode layer is in contact with the collector.

4. An electric double-layer capacitor comprising:
   a capacitor element including a positive electrode, a negative electrode facing the positive electrode, and a separator disposed between the positive electrode and the negative electrode;
   an electrolytic solution with which the capacitor element is impregnated; and
   an outer housing accommodating the capacitor element and the electrolytic solution therein,
   wherein at least one of the positive electrode and the negative electrode includes:
   a collector including a protective layer containing phosphorous on a surface thereof; and
   a polarizable electrode layer that is formed above the collector and capable of reversibly adsorbing and desorbing ions, and
   wherein an amount of a phosphorous compound per unit surface area of the collector, eluted when the collector is immersed into water, is not greater than 1.35 mg/m² in terms of phosphorous equivalent.

5. The electric double-layer capacitor according to claim 4, further comprising a conductive layer in contact with the collector,
wherein the polarizable electrode layer is in contact with the conductive layer.

6. The electric double-layer capacitor according to claim 4, wherein the polarizable electrode layer is in contact with the collector.

* * * * *